US005983172A

United States Patent [19]

Takashima et al.

[11] Patent Number: 5,983,172

[45] Date of Patent: Nov. 9, 1999

[54] METHOD FOR CODING/DECODING, CODING/DECODING DEVICE, AND VIDEOCONFERENCING APPARATUS USING SUCH DEVICE

[75] Inventors: Makoto Takashima, Funabashi; Yoshiaki Asakawa, Kawasaki, both of Japan

[73] Assignee: Hitachi, Ltd., Tokyo, Japan

[21] Appl. No.: 08/759,085

[22] Filed: Nov. 29, 1996

[30] Foreign Application Priority Data

Nov. 30, 1995 [JP] Japan .................................... 7-312481

[51] Int. Cl.$^6$ ........................................................ G01L 9/00

[52] U.S. Cl. .......................... 704/203; 704/205; 704/224; 704/229; 704/230

[58] Field of Search .................................... 704/203, 205, 704/224, 229, 230

[56] References Cited

FOREIGN PATENT DOCUMENTS 3-184098 8/1991 Japan .

OTHER PUBLICATIONS

IEEE Journal On Selected Areas In Communications, vol. 6, No. 2, Feb., 1988, "Transform Coding of Audio Signals Using Perceptual Noise Criteria", J.D. Johnston, pp. 314–323.

*Primary Examiner*—David R. Hudspeth
*Assistant Examiner*—Susan Wieland
*Attorney, Agent, or Firm*—Fay, Sharpe, Beall, Fagan, Minnich & McKee

[57] ABSTRACT

The object of the invention is to provide a coding/decoding method in which degradation of sound quality perceptible by the listener does not occur at an low bit rate. A shift number calculation section of a decoding device divides a frequency domain into at least two sub-bands, and approximates each of normalized transform coefficients in the sub-band whose allocated bit value is less than a predetermined threshold using a quantized value of the transform coefficient in a predetermined sub-band other than the sub-band so as to obtain information concerning the approximation, and a multiplexer multiplexes the information and another signal and transmits them. A de-multiplexer of a decoding device separates the code of information concerning the approximation, and a shift number restore section restores the information based thereon. An approximation coefficient calculation section assigns, based on the information concerning the approximation, the transform coefficient values in the predetermined sub-band to the normalized transform coefficients whose allocated bit value is less than the predetermined threshold.

25 Claims, 7 Drawing Sheets

METHOD FOR CODING/DECODING, CODING/DECODING DEVICE, AND VIDEOCONFERENCING APPARATUS USING SUCH DEVICE

BACKGROUND OF THE INVENTION

This invention is related to a coding/decoding method and a coding/decoding apparatus for coding a signal or decoding a coded signal. More specifically, it is related to a coding/decoding method and a coding/decoding apparatus which is suitable for obtaining a high quality decoded acoustic signal at a low bit rate.

Recently, a number of techniques for coding wide-band speech or an acoustic signal have been proposed for use in multi-media. These techniques often use the adaptive transform coding method, in which an acoustic signal in a time domain is transformed into one in a frequency domain and, using the spectral envelope thereof, the coding is accomplished by adaptably determining a bit allocation or the like on a frequency axis. This is because in the adaptive transform coding method speech quality is not affected by the input acoustic signal and the bit rate can be low due to the application of auditory masking effects. Such coding/decoding methods are disclosed in Japanese Patent Application laid open No. 3-184098, and "Transform Coding of Acoustic Signals Using Perceptual Noise Criteria: James D. Johnston: IEEE Journal on Selected Areas in Communications, Vol. 6, No. 2".

The above mentioned adaptive transform coding/decoding method will now be briefly explained with reference to FIG. 7 which is a block diagram of a system to which the adaptive transform coding/decoding method is applied. As shown in FIG. 7, the system 10' comprises a coding device 12' and a decoding device 14'.

The coding device 12' comprises a buffer 16 which receives a digital acoustic signal supplied from an analog-to digital (A/D) converter (not shown) and temporarily stores it in coding blocks each consisting of an acoustic signal of appropriate data length, a fast Fourier transform (FFT) section 18' connected to the buffer 16 for receiving each coding block from the buffer 16 and subjecting it to fast Fourier transformation, a spectral envelope calculation section 20 connected to the buffer 16 for producing a spectral envelope of the coding block received from the buffer 16, a spectral envelop coding section 22 which produces a spectral envelope code and a coded spectral envelope based on the spectral envelope produced by the spectral envelope calculation section 20, a transform coefficient normalization section 24 which receives transform coefficients produced by the FFT section 18' and the coded spectral envelope produced by the spectral envelop coding section 22 and produces normalized transform coefficients which are normalizations of the transform coefficients, a bit allocation calculation section 26 which receives the coded spectral envelope and calculates a bit allocation for quantizing the normalized transform coefficients, a transform coefficient quantization section 28 which quantizes the normalized transform coefficients based on the bit allocation calculated by the bit allocation calculation section 26, and a multiplexer 30 which outputs a digital transmission code obtained by multiplexing the quantized normalized transform coefficient code and spectral envelope code. The digital transmission code produced by the thus structured coding device 12' is stored in a storage medium such as an optical disk or transferred to the decoding device 14' via a communication line.

On the other hand, the decoding device 14' comprises a de-multiplexer 32 which de-multiplexes the digital transmission code received from a storage medium such as an optical disk or from the multiplexer 30 of the coding device 12' to obtain quantized normalized transform coefficients and a spectral envelope code, a spectral envelope decoding section 34 which receives the spectral envelope code and decodes it, a bit allocation calculation section 36 which calculates a bit allocation based on the spectral envelope produced by the spectral envelope decoding section 34, a transform coefficient inverse-quantization section 38 which inverse-quantizes the quantized normalized transform coefficient based on the bit allocation calculated by the bit allocation calculation section 36, a transform coefficient restore section 40 which restores the transform coefficients based on the spectral envelope produced by the spectral envelope decoding section 34, an inverse FFT section 42' which performs inverse fast Fourier transformation based on the transform coefficients restored by the transform coefficient restore section 40, and a buffer 44 which temporarily stores each signal (coding block) produced by the inverse FFT section 42'. The coding block temporarily stored in the buffer 44 is read out in an appropriate manner, whereby an acoustic signal 45 can be obtained.

It is well known that components having large power often concentrate in the low frequency band of the acoustic signal. The above mentioned adaptive transform coding method can be called a technique for obtaining codes of low distortion and high compression rate efficiently using unevenness of power in a frequency band.

However, it is also known that in the adaptive transform coding method, decreasing the bit rate in order to increase the compression rate increases signal degradation. This is because the adaptive quantization of the normalized transform coefficients often produces no bit for certain frequency bands, especially high frequency bands generally having low power.

In the conventional adaptive transform coding method, an attempt is made to solve this problem by setting that the normalized transform coefficient in a band having no allocated bit to 0 (zero) or to a random value. If the number of bands to which one of those techniques is applied is relatively small in the adaptive transform coding method, problems seldom occur. However, if the technique is applied to a number of successive bands at an extremely low bit rate, the sound quality is degraded to an extent noticeable to listeners. The degradation includes dropout of bands due to setting the normalized transform coefficient to 0 (zero) and occurrence of noise due to setting it to the random value. This disarranges the harmonic elements of the acoustic signal, which results in a serious problem.

In other words, the conventional adaptive transform coding method does not sufficiently deal with the degradation owing to the occurrence of a number of bands having no allocated bits and is therefore not sufficient for coding an acoustic signal at an extremely low bit rate.

SUMMARY OF THE INVENTION

It is an object of the invention to provide a coding/decoding method and a coding/decoding apparatus which encodes a signal to generate a code at an extremely low bit rate, and in which degradation of sound quality perceptible by the listener owing to, for example, band dropout, and occurrence of noise, does not occur when decoding the code.

The above and other objects of the invention are accomplished by a coding/decoding method for, on the coding side, transforming a signal into coefficients in a frequency domain in blocks each consisting of a predetermined number of samples, calculating normalized coefficients which are normalizations of the coefficients of the signal in the frequency domain using a rough shape of frequency components of the signal, encoding the signal by adaptively controlling a bit allocation and a step size of quantization of the normalized transform coefficients based on the rough shape of frequency components of the signal, and transmitting the coded signal, and, on a decoding side, dividing the frequency domain of the received signal into at least two sub-bands, and approximating the normalized transform coefficient in each sub-band whose allocated bit value is less than a predetermined threshold using a quantized value of the normalized transform coefficient in another sub-band.

Alternatively, the coding side comprises the steps of dividing the frequency domain of the signal into at least two sub-bands, obtaining information concerning approximation for approximating each of the normalized transform coefficients in a sub-band whose allocated bit quantized value of the transform coefficient in another sub-band, and transmitting the information concerning the approximation to the decoding side, and the decoding side comprises the steps of conducting an approximation based on the information concerning the approximation.

Specifically, on the coding side the information concerning the approximation is preferably obtained such that correlation between normalized transform coefficients not subjected to the quantization in the sub-band and the quantized normalized transform coefficients in another sub-band becomes maximum.

More specifically, a number of shifts or an amount of expansion/shrinkage of another sub-band is used as the information concerning the approximation.

In a further preferred aspect of the invention, a predetermined sub-band is positioned on the lowest frequency side in the divided sub-bands.

The above mentioned objects are accomplished by a coding device and/or decoding device using above mentioned method.

BRIEF DESCRIPTION OF THE DRAWINGS

Preferred embodiments of the present invention will now be explained in conjunction with the accompanying drawings, in which.

DESCRIPTION OF THE PREFERRED EMBODIMENTS

Figure 1:
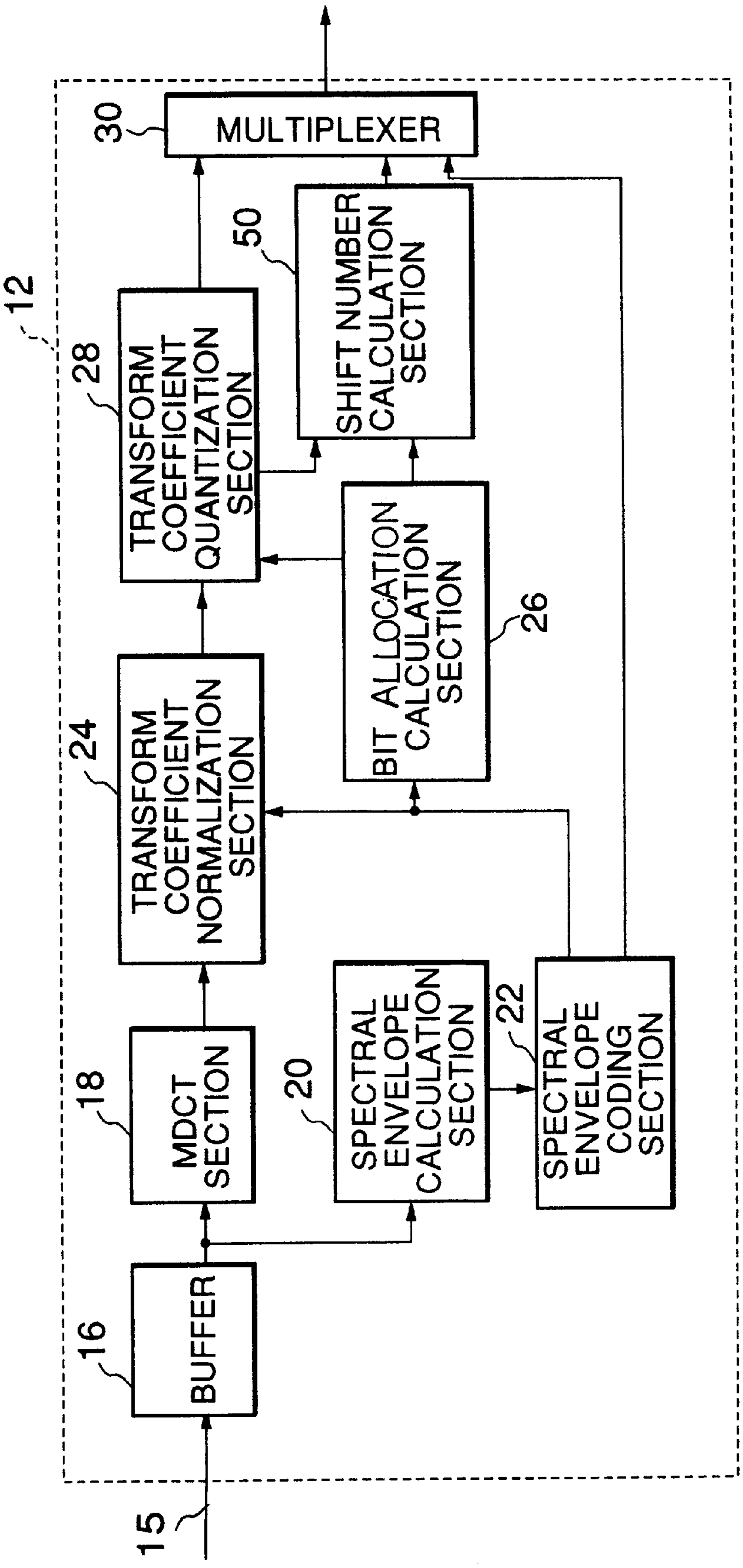
FIG. 1 is a block diagram of a system employing an acoustic signal coding/decoding method in accordance with the present invention.
Figure 2:
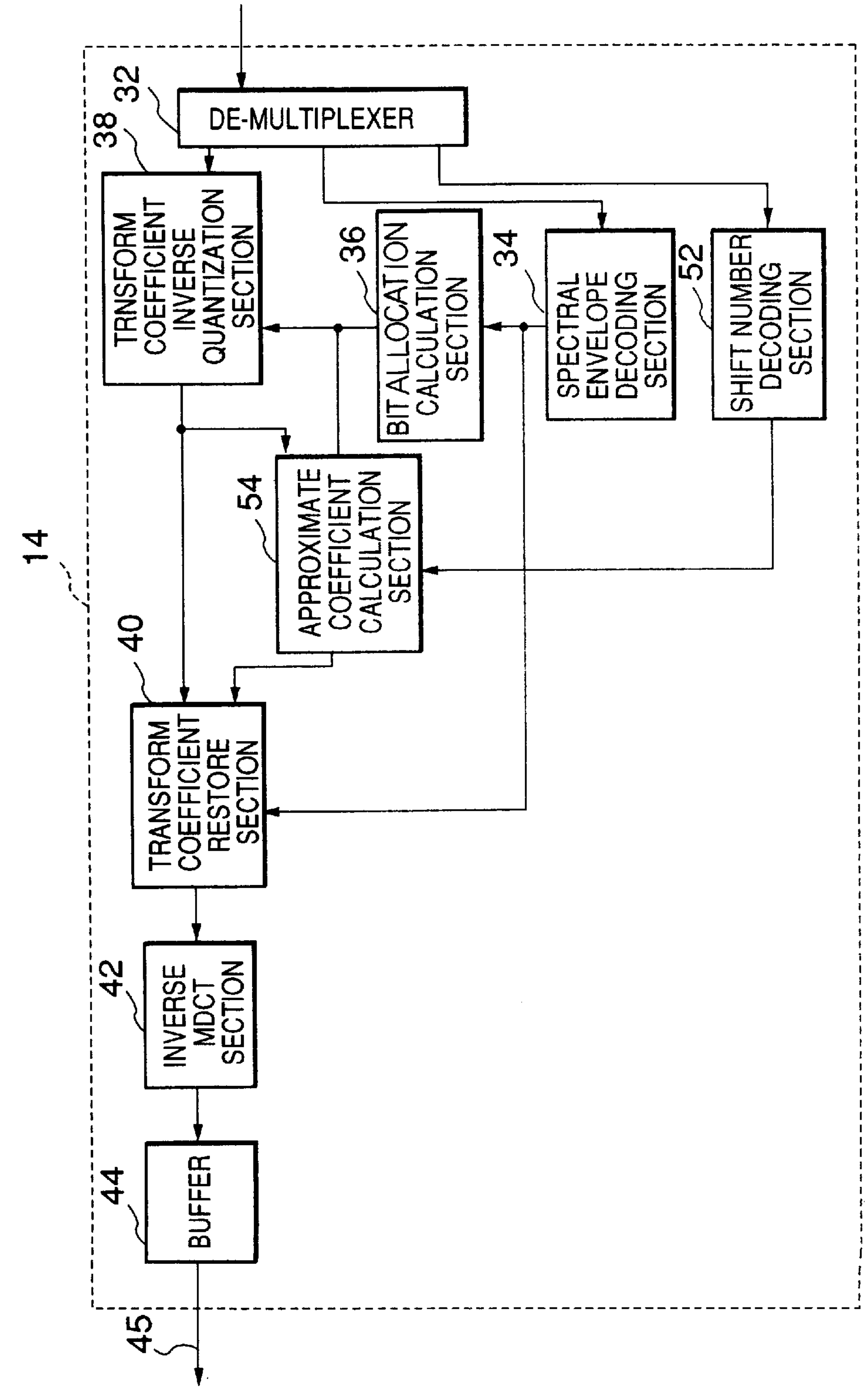
FIG. 2 is a block diagram of a decoding device of the system.
Figure 7:
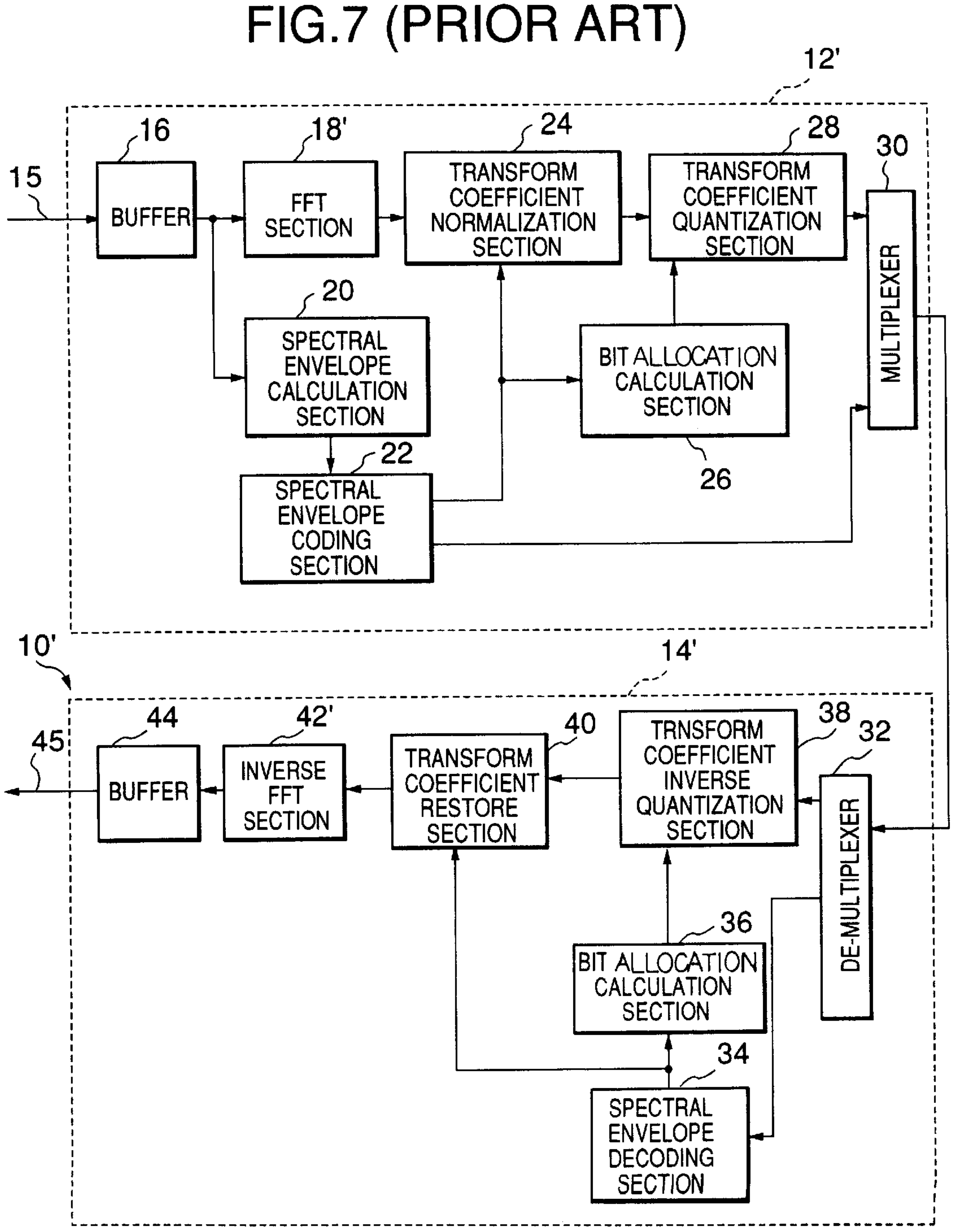
FIG.7 (PRIOR ART)
FIG. 7 is a block diagram of a system employing the adaptive transform coding/decoding method.

Embodiments of the present invention will now be explained with reference to the accompanying drawings. FIG. 1 is a block diagram of a system employing an acoustic signal coding/decoding method in accordance with the present invention, and FIG. 2 is a block diagram of the decoding device of the system. In FIGS. 1 and 2, the same components as those in FIG. 7 are assigned the same reference numerals.

As shown in FIG. 1, the coding device 12 comprises a buffer 16 which receives a digital acoustic signal supplied from an analog-to-digital (A/D) converter (not shown) and temporarily stores it in a predetermined manner, a modified discrete cosine transform (MDCT) section 18 connected to the buffer 16 for receiving the coding block of the acoustic signal of a predetermined data length from the buffer 16 and for subjecting it to modified discrete cosine transform, a spectral envelope calculation section 20 connected to the buffer 16, a spectral envelop coding section 22 which produces a spectral envelope code and the like, a transform coefficient normalization section 24 which receives transform coefficients produced by the MDCT section 18 and a coded spectral envelope produced by the spectral envelope coding section 22 and produces normalized transform coefficients, a bit allocation calculation section 26 which receives the coded spectral envelope and calculates a bit allocation, a transform coefficient quantization section 28 which quantizes the normalized transform coefficients based on the calculated bit allocation, a shift number calculation section 50 which calculates a number of shifts constituting approximate information as described later and encodes it, and a multiplexer 30 which multiplexes the quantized normalized transform coefficient code, the spectral envelope code and the shift number code and outputs them as a digital transmission code. The multiplexer 30 is connected to a storage medium such as an optical disk or to a communication line.

As shown in FIG. 2, the decoding device 14 comprises a de-multiplexer 32 which de-multiplexes the digital transmission code received from the optical disk or other such storage medium or from the multiplexer 30 of the coding device 12 to obtain quantized normalized transform coefficients, a spectral envelope code and a shift number code, a spectral envelope decoding section 34 which receives the spectral envelope code and decodes it, a bit allocation calculation section 36 which calculates a bit allocation based on the decoded spectral envelope, a transform coefficient inverse-quantization section 38 which inverse-quantizes the quantized normalized transform coefficients based on the calculated bit allocation, a shift number decoding section 52 which decodes the shift number code, an approximate coefficient calculation section 54 which calculates approximate values of appropriate transform coefficients based on the decoded number of shifts, a transform coefficient restore section 40 which restores transform coefficients based on the spectral envelope, the values obtained by the approximate coefficient calculation section 54 and the like, an inverse MDCT section 42 which performs inverse modified discrete cosine transform based on the transform coefficients restored by the transform coefficient restore section 40, and a buffer 44 which temporarily stores each signal (coding block) produced by the inverse MDCT section 42.

Processing operations of the thus constructed coding device 12 and decoding device 14 of the system 10 will now be generally explained with reference to the flowcharts of FIGS. 3A and 3B.

Figure 3A:
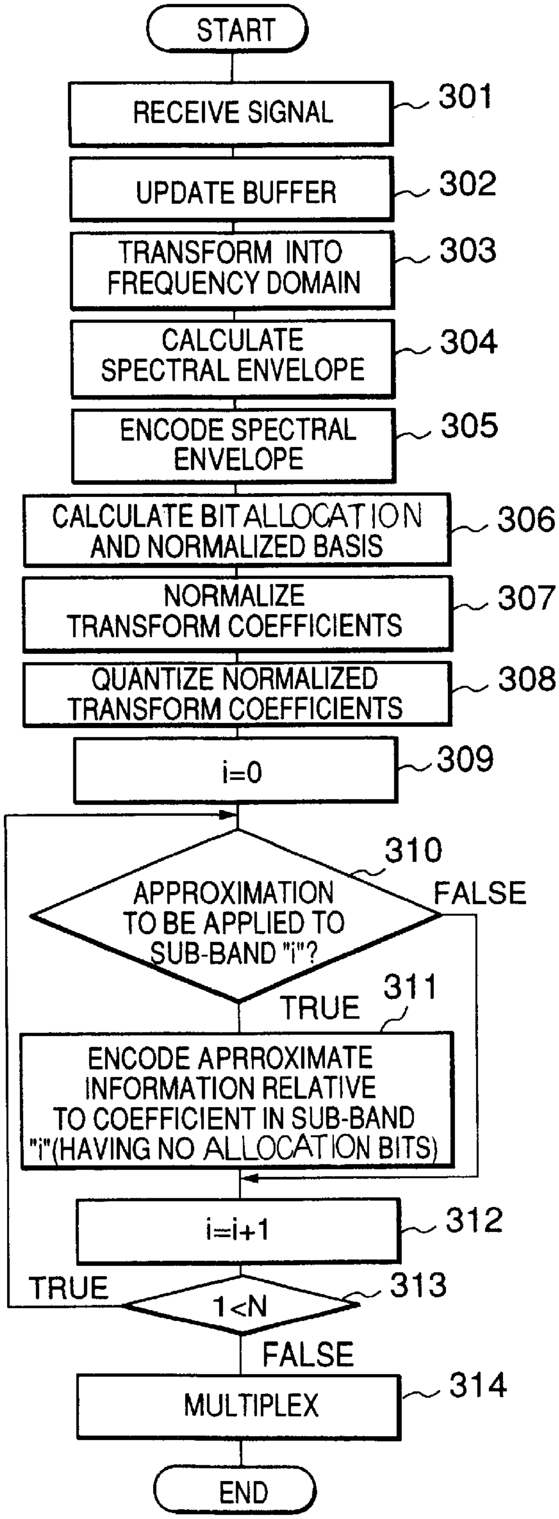
FIGS. 3A and 3B are flowcharts summarizing processing operations of the coding device and the decoding device in accordance with the present invention.

As shown in FIG. 3A, in the coding device 12, the buffer 16 receives a digital acoustic signal 15, based thereon obtains a coding block whose sample number equals M, and temporarily stores it (step 302). The MDCT section 18 receives one coding block from the buffer 16 and subjects it to modified discrete cosine transform to obtain transform coefficients in a frequency domain (step 303). On the other hand, the spectral envelope calculation section 20 receives the same coding block and calculates the spectral envelope thereof (step 304). Then the spectral envelope coding section 22 encodes the calculated spectral envelope (step 305). In this embodiment, an estimated value such as the average power of adjacent bands, an estimate value obtained by a linear prediction analysis, or the like is used for the spectral envelope. However, the invention is obviously not limited to using these estimated values as the spectral envelope.

Then, the transform coefficient normalization section 24 calculates a normalization basis based on the coded spectral envelope produced by the spectral envelope coding section 22 (step 306). The bit allocation calculation section 26 calculates a bit allocation based on the coded spectral envelope. Although this can be obtained using a rate-distortion theory, it is apparent that other techniques may be used to obtain it. Further, the transform coefficient normalization section 24 calculates normalized transform coefficients based on the calculated normalization basis (step 307).

Then, the transform coefficient quantization section 28 receives the normalized transform coefficients produced by the transform coefficient normalization section 24 and quantizes them using a Max's quantizer or the like (step 308). Thereafter, the processing operations of steps 309 to 313 assign approximate coefficients as the coefficients of bands having no allocated bits.

More specifically, the band of the input acoustic signal is divided into a plurality of (e.g. N) sub-bands. Thereafter, a predetermined sub-band is shifted such that the quantized normalized transform coefficients in every sub-band "i" ($i \leqq N$) other than the predetermined sub-band most closely resemble respective normalized transform coefficients in the predetermined sub-band, thereby determining values corresponding to quantized normalized transform coefficients having no allocated bits (step 311).

Then, the multiplexer 30 multiplexes the spectral envelope code, the quantized normalized transform coefficient and a code indicating the number of shifts (a shift number code) and outputs a multiplexed transmission code (step 314).

Figure 3B:
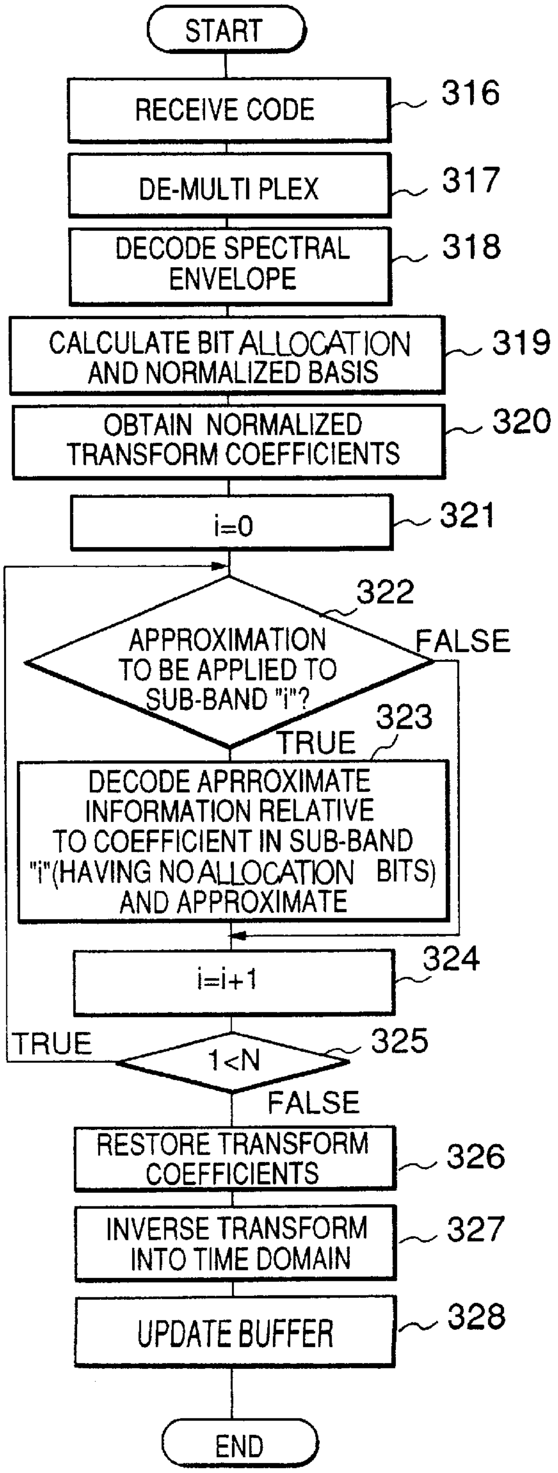

On the other hand, as shown in FIG. 3B, in the decoding device 14, the de-multiplexer 32 receives the transmission code and separates it into a spectral envelope code, quantized normalized transform coefficients and a shift number code and outputs them to the spectral envelope decoding section 34, the transform coefficient inverse-quantization section 38 and the shift number decoding section 52, respectively.

The spectral envelope decoding section 34 decodes the spectral envelope code by a process substantially opposite from the process of the spectral envelope coding section 22 of the coding device 12. The bit allocation calculation section 36 calculates the bit allocation in accordance with the spectral envelope decoded by the spectral envelope decoding section 34 and supplies it to the transform coefficient inverse-quantization section 38. The transform coefficient inverse-quantization section 38 calculates a normalization basis of the normalized transform coefficient code (step 319). and obtains normalized transform coefficients by use of inverse-quantization based on the bit allocation and the like (step 320).

Then, as shown in steps 321 to 325 in FIG. 3B, the approximate coefficient calculation section 54 assigns to coefficients having no allocated bits appropriate coefficient values in accordance with the number of shifts decoded by the shift number decoding section 52 every divided band "i" ($i \leqq N$). Thereafter, the transform coefficients are restored based on the obtained approximate coefficients, normalization basis and the like (step 326). The inverse MDCT section 42 obtains a signal in the time domain based on the thus restored transform coefficients (step 327). The buffer 44 temporarily stores the obtained signal in the time domain, namely, the time domain signal (step 328).

The system of the embodiment employing the present invention will now be explained more specifically. In the processing operation by the transform coefficient quantize section 28 of this embodiment, approximation is accomplished in the following manner. The frequency band is divided into two sub-bands of equal range, and the lower frequency sub-band is shifted to lie on the higher frequency sub-band so as to assign the normalized transform coefficient values in the lower frequency sub-band to the respective coefficients having no allocated bits in the higher frequency sub-band.

Accordingly, in this embodiment, since the number of shifts is determined in advance, the shift number calculation section 50 in the coding device 12 and the shift number decoding section 52 of the decoding device 14 do not function. According to this embodiment, appropriate information concerning the approximation can be obtained by use of a simple calculation.

Figure 4A:
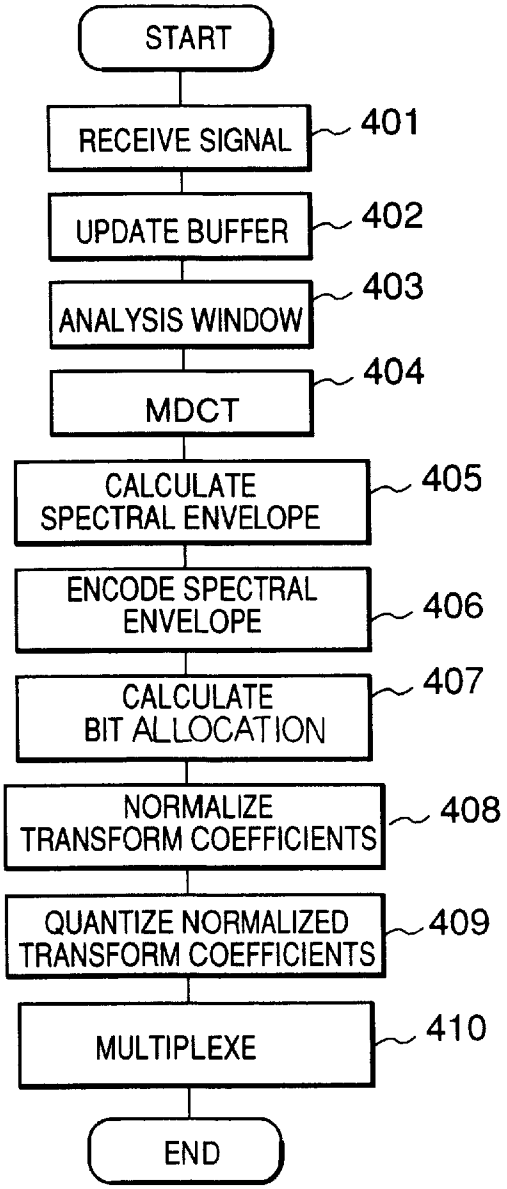
FIGS. 4A and 4B are flowcharts showing processing operations of the coding device and the decoding device in accordance with a first embodiment of the present invention.
Figure 4B:
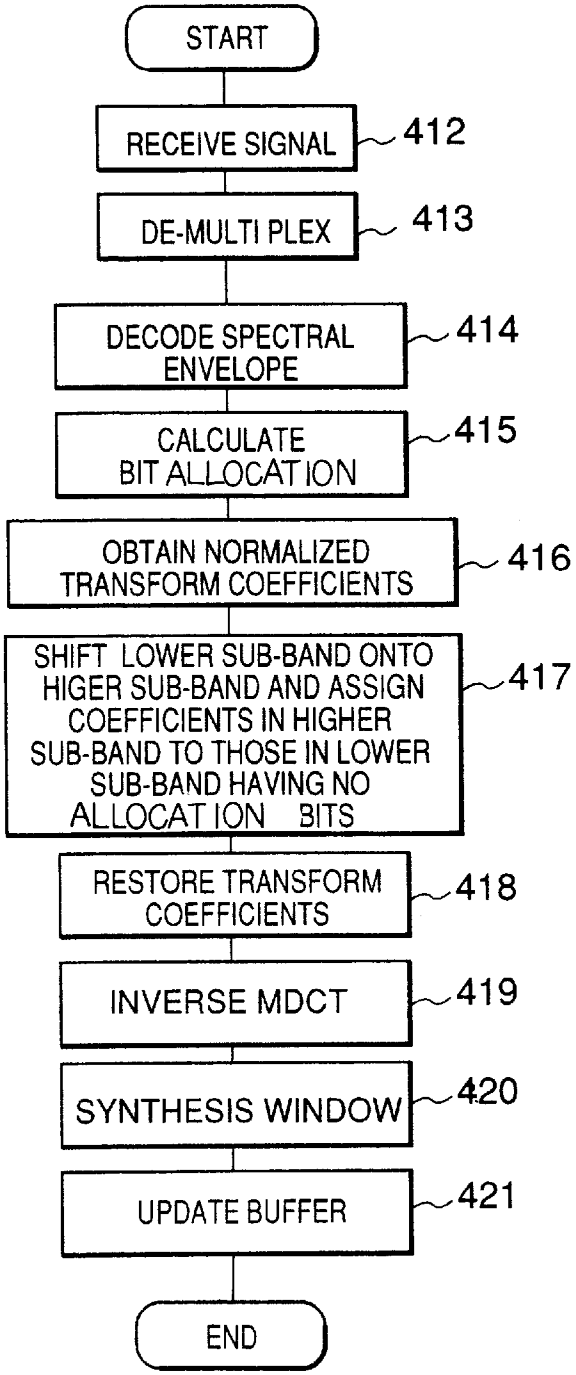

FIGS. 4A and 4B show the processing operations in the coding device 12 and decoding device 14 in accordance with this embodiment.

First of all, the buffer 16 of the coding device 12 receives a digital acoustic signal 15. In this embodiment, the band of the acoustic signal is limited to a range between 50 Hz to 7000 Hz, and the sampling frequency thereof is 16 kHz. The buffer 16 generates a coding block consisting of 320 signal samples such that a first half set of 160 samples overlaps the preceding coding block, while a second half set of 160 samples overlaps the subsequent coding block. In the buffer 16, an analysis window based on equation (1) is applied to the coding block, and the windowed coding block is stored (steps 402 and 403). This operation corresponds to the step 302 in FIG. 3A.

$$w(x)=\sin(\pi/M)\cdot x \tag{1}$$

where "x" indicates the position of the sample in the coding block, and "M" is the number of samples in the coding block. In this embodiment, "M" equals 320.

Then, the MDCT section 18 subjects the windowed coding block to the modified discrete cosine transform to obtain 160 MDCT coefficients (step 404). Thereafter, the spectral envelope calculation section 20 calculates a spectral envelope (step 405), and the spectral envelope coding section 22 encodes the obtained spectral envelope (step 406). In this embodiment, a set of unequal power average values calculated every band as shown in Table 1 is obtained as the spectral envelope based on the MDCT coefficients normalized by the power of MDCT coefficients of the all bands. In this connection, in order to encode the spectral envelope, after cubic auto-regressive prediction (hereinafter referred to as "AR prediction"), the predictive residual is subjected to a split vector quantization (hereinafter referred to as "Split-VQ")

TABLE 1

| j | k | j | k |
|---|---|---|---|
| 0 | 0 | 21 | 29, 30 |
| 1 | 1 | 22 | 31, 32 |
| 2 | 2 | 23 | 33-35 |
| 3 | 3 | 24 | 36-38 |
| 4 | 4 | 25 | 39-41 |
| 5 | 5 | 26 | 42-44 |
| 6 | 6 | 27 | 45-48 |
| 7 | 7 | 28 | 49-52 |
| 8 | 8 | 29 | 53-56 |
| 9 | 9 | 30 | 57-60 |
| 10 | 10 | 31 | 61-65 |
| 11 | 11 | 32 | 66-70 |
| 12 | 12 | 33 | 71-77 |
| 13 | 13, 14 | 34 | 78-84 |
| 14 | 15, 16 | 35 | 85-93 |
| 15 | 17, 18 | 36 | 94-102 |
| 16 | 19, 20 | 37 | 103-113 |
| 17 | 21, 22 | 38 | 114-124 |
| 18 | 23, 24 | 39 | 125-138 |
| 19 | 25, 26 | 40 | 139-159 |
| 20 | 27, 28 | | |

In Table 1, "j" indicates an index concerning the band where the spectral envelope parameter is calculated, and "k" indicates an index concerning the band of the MDCT coefficient. These indices are arranged in ascending order.

In this connection, values obtained by learning based on a number of input acoustic signals are used for the predictive coefficients of the cubic AR prediction, and the construction of each vector in the Split-VQ and the number of quantized bits are set as shown in Table 2.

TABLE 2

| L | CONSTRUCTION (j) OF VECTOR L | NUMBER OF QUANTIZATION BITS |
|---|---|---|
| 0 | 0~2 | 8 |
| 1 | 3~5 | 8 |
| 2 | 6~9 | 8 |
| 3 | 10~13 | 8 |
| 4 | 14~19 | 8 |
| 5 | 20~25 | 8 |
| 6 | 26~32 | 8 |
| 7 | 33~40 | 8 |

In Table 2, "L" indicates an index concerning a spectral envelope dividing vector of the Split-VQ. In addition, the power of the MDCT coefficients in all bands is encoded separately. In this embodiment, a learned 8-bit scalar quantizer is used for this.

As mentioned above, after the coded spectral envelope has been obtained in the steps 405 and 406, based thereon the bit allocation calculation section 26 calculates a bit allocation for quantizing the MDCT coefficients (step 407). On the other hand, the transform coefficient normalization section 24 normalizes the transform coefficients (step 408). The bit allocation in the bit allocation calculation section 26 is conducted in accordance with equation (2).

$$R_k = R^* + \frac{1}{2}\log_2\sigma_k^2 + \frac{1}{2L}\sum_{k=0}^{L-1}\frac{1}{2}\log_2\sigma_k^2 \qquad (2)$$

Where "Rk" is the number of allocated bits concerning the MDCT coefficient of an index "k", "R*" is the average of allocated bits for one coefficient, "σk" is the spectral envelope value at the frequency corresponding to the MDCT coefficient of the index "k", and "L" is the number of the MDCT coefficients. In this embodiment, "L" equals 160, and "R*" equals 1.05. In addition, "Rk" is limited to a range between 0 (zero) and 5 for re-allocation if an excess or shortage occurs.

Furthermore, in the transform coefficient normalization section 24, the normalization is conducted by dividing each transform coefficient by the coded spectral envelope at the frequency concerned.

Then, the transform coefficient quantization section 28 quantizes the normalized transform coefficients calculated in the step 408 using the bit allocation obtained in the step 407 (step 409). In this embodiment, a conventional 1-to-5-bit Max's quantizer is used for the quantization. The multiplexer 30 multiplexes the thus obtained spectral envelope power code, the spectral envelope predictive residual Split-VQ code, and the normalized transform coefficient code so as to obtain the transmission code (step 410). In this way, the coding for one coding block is completed.

The decoding device 14 in accordance with this embodiment will now be explained in detail. The de-multiplexer 32 which has received the transmission code produces the spectral envelope power code, the spectral envelope predictive residual Split-VQ code, and the normalized transform coefficient code from the transmission code (step 413). Based thereon, the spectral envelope decoding section 34 decodes the spectral envelope (step 414), the bit allocation calculation section 36 calculates the bit allocation (step 415), and then, the transform coefficient inverse-quantization section 38 obtains the normalized transform coefficients by use of inverse-quantization (step 416). In the transform coefficient inverse-quantization section 38, random values are assigned to the coefficients having no allocated bits in the lower frequency sub-band, namely the band between 0 (zero) Hz and 4 kHz in a conventional manner. Next, regarding the coefficients having no allocated bits in the higher frequency sub-band, namely, the band between 4 kHz and 8 kHz, the respective transform coefficient values in the lower frequency sub-band are assigned to them when the lower frequency sub-band is shifted to lie on the higher frequency sub-band (step 417).

The transform coefficients are restored by the transform coefficient restore section 40 based on the thus obtained normalized transform coefficients in all bands and the decoded spectral envelope (step 418). The inverse MDCT section 42 subjects the restored transform coefficients to inverse modified discrete cosine transform (step 419). A synthesis window in the buffer 44 is applied to the time domain signal produced by the inverse MDCT section 42 (step 420). Then, the second half set of 160 samples of the coding block subjected to the synthesis window obtained by the processing operation just prior to the present processing operation is added to the first half set of 160 samples of the coding block subjected to the synthesis window obtained by the present processing operation so as to obtain a sampled acoustic signal consisting of 160 samples. This acoustic signal is stored in the buffer 44. In this connection, the synthesis window corresponds to the window based on the equation (1).

The acoustic signal can be restored by repeating the above mentioned processing operations. The thus obtained acoustic signal is transferred to a digital-to-analog (D/A) converter (not shown), and then to an amplifier (not shown) to be reproduced by a loudspeaker (not shown).

In this embodiment, the lower frequency sub-band is shifted to lie on the higher frequency sub-band so as to assign respective coefficient values in the lower frequency sub-band to the coefficients having no allocated bits. Accordingly, it is not necessary to transfer the approximate information such as the number of shifts from the coding device to the decoding device. On the other hand, since the number is shifts is predetermined, it is not possible to obtain such accurate approximate values of the coefficients in the higher frequency band. However, since the frequency resolution of the human auditory system decreases with the frequency increasing, the clarity of the reproduced sound can be improved by simply repeating the harmonic structure in the lower frequency sub-band, where the power is concentrated and accurate coding is possible, and adding it as a simulated component to a prescribed portion of the higher frequency sub-band.

For example, according to this embodiment, when the acoustic signal is encoded and transmitted at a bit rate of 24 kbit/s and the transmission code is decoded, high quality sound of improved clarity can be obtained as compared with the case that the acoustic signal is encoded and transmitted in a conventional manner and the transmission code is decoded.

The system in accordance with second embodiment of the present invention will now be more specifically explained. In the processing operation by the transform coefficient quantization section 28 of this embodiment, approximation is accomplished in the following manner. A frequency band is divided into three sub-bands, and the lowest frequency sub-band is shifted onto each of the other two sub-bands so as to assign the respective normalized transform coefficient values to the coefficients having no allocated bits in the other sub-bands. Accordingly, in the second embodiment, the shift number calculation section 50 of the coding device 12 and the approximate coefficient calculation section 54 of the decoding device 14 calculate the numbers of shifts for each of two sub-bands.

Figure 5A:
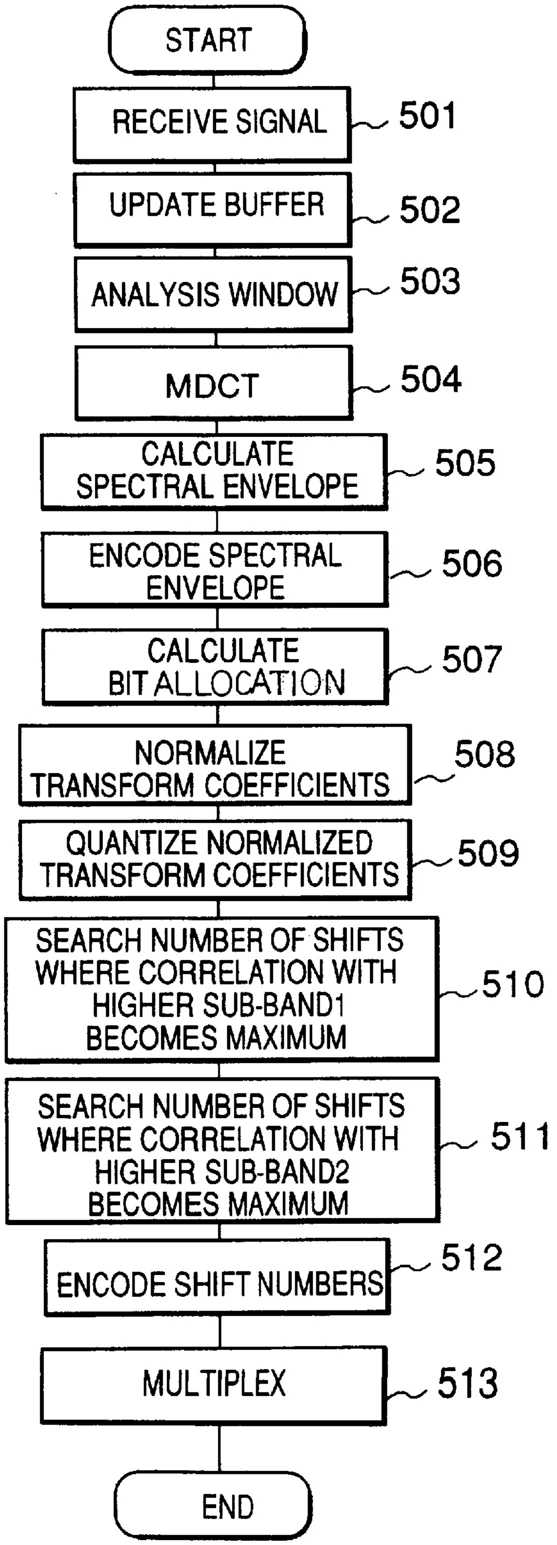
FIGS. 5A and 5B are flowcharts showing processing operations of the coding device and the decoding device in accordance with a second embodiment of the present invention.
Figure 5B:
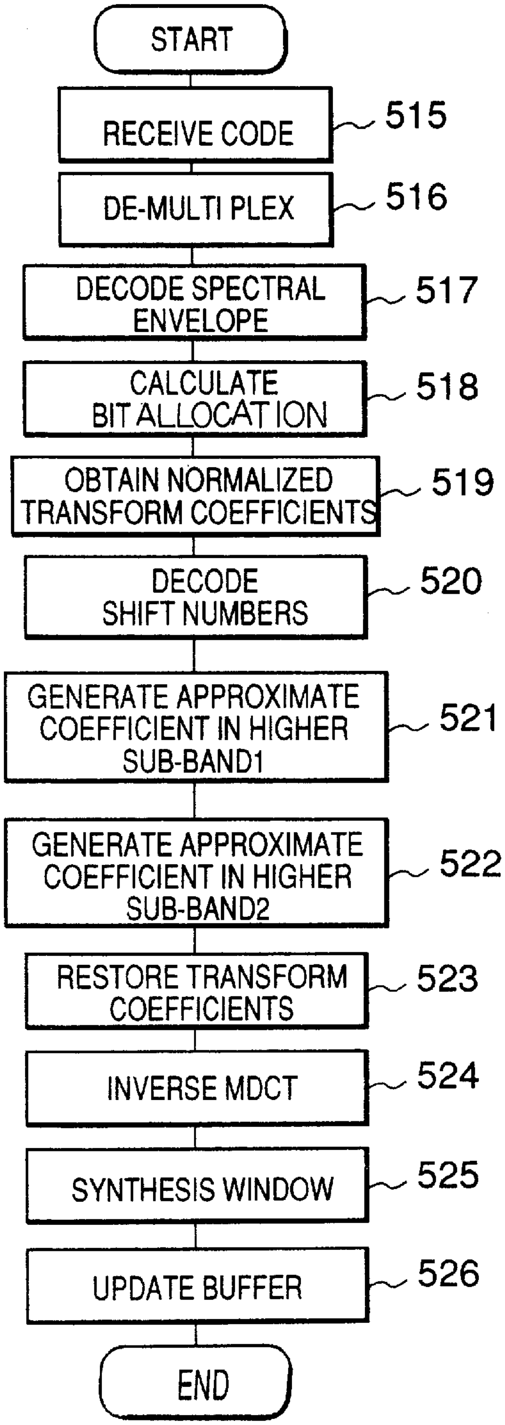

FIGS. 5A and 5B show processing operations of the coding device and the decoding device in accordance with this embodiment.

First, the buffer 16 of the coding device 12 receives a digital acoustic signal. The digital acoustic signal is the same as that of the first embodiment. As in the first embodiment, a coding block consisting of M samples is formed such that predetermined samples overlap the preceding or subsequent coding block (step 502). In this embodiment, M equals 512. Further, an analysis window based on the equation (1) is applied to the coding block and the windowed coding block is stored (step 503).

Then, as in the first embodiment, the coding block is subjected to modified discrete cosine transform by the MDCT section 18, and the spectral envelope in relation to the coding block is calculated by the spectral envelope calculation section 20 (steps 504 and 505). Furthermore, the coding of the spectral envelope by the spectral envelope coding section 22 (step 506), the calculation of bit allocation by the bit allocation calculation section 26 (step 507), the normalization of transform coefficients by the transform coefficient normalization section 24 (step 508), and the quantization of normalized transform coefficients by the transform coefficient quantization section 28 (step 509) are subsequently performed.

In the second embodiment, line spectrum pairs (hereinafter referred to as "LSP") are used as spectrum envelope parameters. A linear predictive coefficient (LPC) analysis frame consisting of 512 samples based on the input acoustic signal is subjected to a Hanning window to perform an LPC analysis of 20th degree, and the thus obtained LPC coefficients are transformed into the LSP. In this connection, in order to encode the LSP, a cubic moving-average prediction (hereinafter referred to as "MA prediction") is used. The predictive residual is encoded using the Split-VQ is used, in which vectors are constructed by dividing on 6th, 6th and 8th degrees in ascending order, and are encoded in an 8-bit manner.

Both predictive coefficients and the residual vector code book used are ones generated by learning a number of samples. The coded LSP is transformed into a power spectrum to obtain a coded spectral envelope. Although the bit allocation is obtained in the same manner as in the first embodiment, "L" and "R" in the equation (2) are set to 256 and 0.828, respectively.

In addition, the normalization of the transform coefficients and the quantization of the normalized transform coefficients are the same as those in the first embodiment.

After the above mentioned processing operations have been completed, approximate information concerning coefficients having no allocated bits in the second and third sub-bands are calculated. In this embodiment, the lowest first sub-band lies between 0 Hz and 4 kHz, the second sub-band lies between 4 kHz and 6 kHz, and the third sub-band lies between 6 kHz and 8 kHz.

In the second embodiment, if there are coefficients having no allocated bits in the second sub-band, the first sub-band is shifted such that the correlation between the normalized transform coefficient values before the quantization in the second sub-band and the quantized values of respective normalized transform coefficients becomes maximum (step 510). This first number of shifts corresponds to the approximate information concerning the second sub-band. Next, if there are coefficients having no allocated bits in the third sub-band, the first sub-band is shifted such that the correlation between the normalized transform coefficient values before the quantization in the third sub-band and the quantized values of respective normalized transform coefficients becomes maximum (step 511). This second number of shifts corresponds to the approximate information concerning the third sub-band.

As apparent from the foregoing, since the first sub-band includes 128 coefficients and the second and third sub-bands include 64 coefficients, respectively, the number of shifts concerning the second sub-band falls within a range between 64 and 127 while the number thereof concerning the third sub-band falls within a range between 128 and 191.

Furthermore, the shift number calculation section 50 encodes the thus obtained numbers of shifts using a 6-bit scalar quantizer (step 512).

The multiplexer 30 multiplexes the thus obtained quantized normalized transform coefficients, the spectral envelope code and the shift number code so as to obtain the transmission code (step 513). The obtained transmission code is stored in a storage medium such as an optical disk (not shown) or transferred to the decoding device 14 via a communication line.

The processing operations in the decoding device 14 in accordance with the second embodiment will now be explained. As shown FIG. 5B, after the transmission code has been transferred (step 515), the de-multiplexer 32 produces the spectral envelope code, the quantized normalized transform coefficient code and the shift number code based on the transmission code (step 516). Then, the spectral envelope decoding section 34 conducts the decoding of the spectral envelope (step 517). In this operation of the embodiment, LSP decoding using MA prediction, transformation of the LSP into the LPC, and the transformation of the LPC into the spectral envelope are subsequently performed.

Then, the calculation of bit allocation based on the decoded spectral envelope and the inverse-quantization of the normalized transform coefficient are performed by the bit allocation calculation section 36 and the transform coefficient inverse-quantization section 38, respectively (steps 518 and 519). These operations correspond to the calculation of bit allocation (step 507) and the quantization of normalized transform coefficients (step 509) by use of the coding device 12. Furthermore, the shift number decoding section 52 decodes the number of shifts (step 520).

Next, in the approximate coefficient calculation section 54, the first sub-band is shifted in accordance with the decoded first number of shifts so as to assign the respective normalized transform coefficient values in the first sub-band to the coefficients having no allocated bits in the second sub-band (step 521). Further, the first sub-band is shifted in accordance with the decoded second number of shifts so as to assign the respective normalized transform coefficient values in the first sub-band to the coefficients having no allocated bits in the third sub-band (step 522). The thus obtained approximate values for the coefficients having no allocated bits are applied to the transform coefficient restore section 40.

In this way, all coefficients in the first to third sub-bands can be obtained. Then, the transform coefficient restore section 40 restores the transform coefficients, and the inverse MDCT section 42 conducts the transformation into the time domain signal (steps 523 and 524).

Furthermore, in the buffer 44, The synthesis window is applied to the time domain signal produced by the inverse MDCT section 40 (step 525). Then, the second half set of 256 samples of the coding block subjected to the synthesis window obtained by the processing operation just prior to the present processing operation is added to the first half set of 256 samples of the coding block subjected to the synthesis window obtained by the present processing operation so as to obtain a sampled acoustic signal consisting of 256 samples. This acoustic signal is stored in the buffer 44. The processing operations of steps 525 and 526 are the same as those in the first embodiment.

The acoustic signal can be restored by repeating the above mentioned processing operations. The thus obtained acoustic signal is transferred to a digital-to-analog (D/A) converter (not shown) and then to an amplifier (not shown) to be reproduced by a loudspeaker (not shown).

In this embodiment, the coding device transfers to the decoding device the transmission code containing the information for approximating the coefficients having no allocated bits in the higher frequency sub-bands such as the second and third sub-bands. Accordingly, the number of bits assigned for the normalized transform coefficients is slightly decreased. As mentioned above, since power is generally concentrated in the lower band, the lost bits are made up for by bits in the higher frequency band, which slightly degrades the quantization accuracy in the higher frequency band. However, since the transmission of the approximate information improves the accuracy of approximation in the higher frequency band containing coefficients having no allocated bits, it is possible to improve the clarity of the reproduced sound as a whole.

For example, according to this embodiment, when the acoustic signal is encoded and transmitted at a bit rate of 24 kbit/s and the transmission code is decoded, high quality sound of improved clarity can be obtained as compared with the case that the acoustic signal is encoded and transmitted in a conventional manner and the transmission code is decoded.

Figure 6:
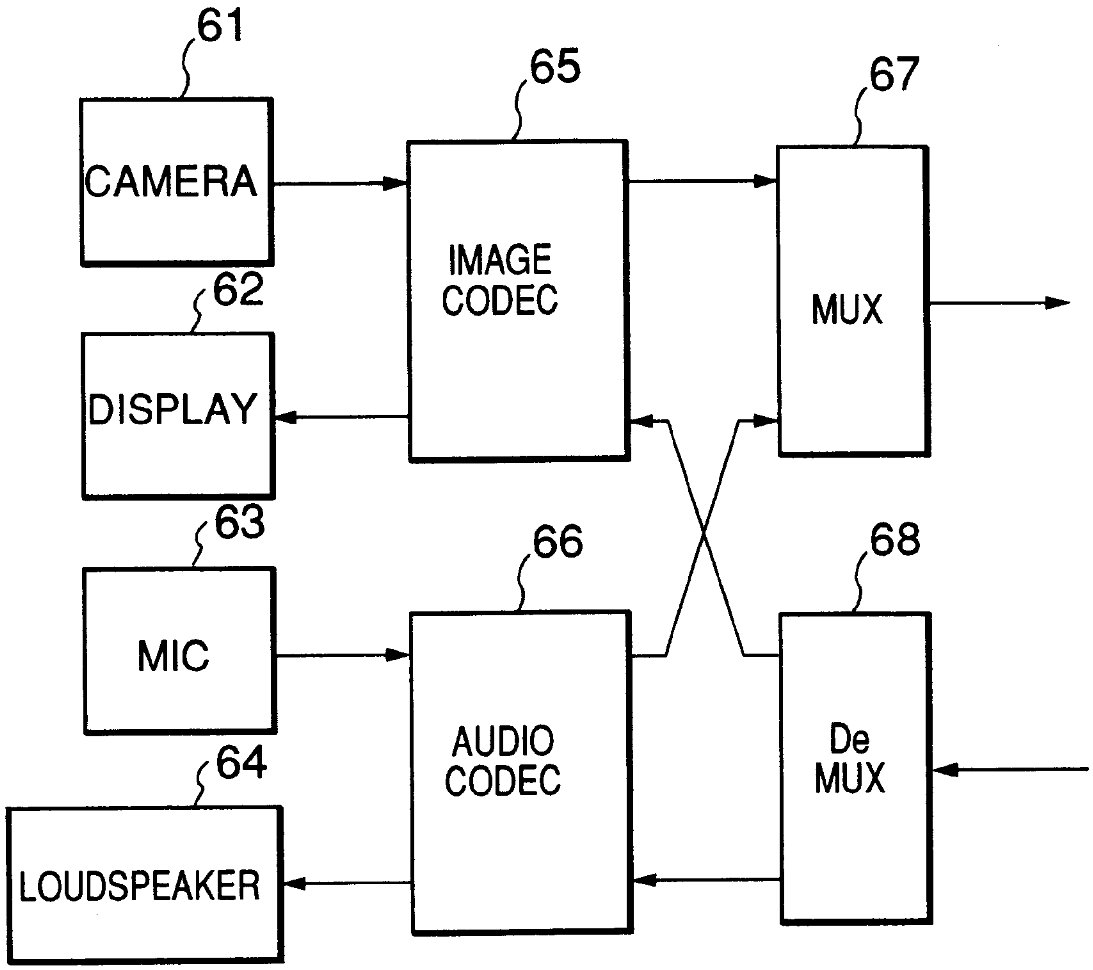
FIG. 6 is a block diagram of a videoconferencing apparatus in which the acoustic signal coding/decoding device is incorporated.

An apparatus which incorporates a coding/decoding device in accordance with the present invention will now be explained. FIG. 6 is a block diagram of a videoconferencing apparatus incorporating an acoustic signal coding/decoding device.

as shown in FIG. 6, the videoconferencing apparatus 60 comprises a Camera 61 which takes pictures of television conference participants at one location, a display 62 which displays an image of other participants attending the television conference at another location, a microphone 63 which picks up the voices of the participants at the one location, a loudspeaker 64 which reproduces the voices of the other participants, a video coding-decoding (CODEC) section 65 which encodes the image signal produced by the camera 61 and decodes a transmission code to obtain an image signal, an audio CODEC section 66 which encodes the acoustic signal from the microphone 63 and decodes a transmission code to obtain an acoustic signal, a multiplexer 67 which multiplexes the transmission code concerning the image signal and that concerning the acoustic signal, and de-multiplexer 68 which de-multiplexes the transmission code to obtain the transmission code concerning the image signal and that concerning the acoustic signal. The audio CODEC section 61 is provided with the coding/decoding device in accordance with the present invention.

The output from the multiplexer 67 is transferred to the other videoconferencing apparatuses (not shown) via a communication line, while the output from the other videoconferencing apparatus is transferred to the de-multiplexer 68 of the videoconferencing apparatus 60 via a communication line.

In the thus structured videoconferencing apparatus 60, the image signal produced by the camera 61 is transformed into a digital image signal by an A/D converter in the image CODEC section 65, and based thereon, an appropriate transmission code can be obtained in a conventional manner. On the other hand, the acoustic signal produced by the microphone 63 is transformed into a digital acoustic signal by an A/D converter in the audio CODEC section 66. Assuming that the audio CODEC section 66 is provided with the coding/decoding device of the first embodiment, an appropriate transmission code can be obtained in the manner explained in connection with the coding device of the first embodiment. The multiplexer 67 multiplexes the thus obtained transmission code concerning the image signal and that concerning the acoustic signal so as to transfer the multiplexed transmission code to the other videoconferencing apparatus connected to the communication line in advance.

On the other hand, the multiplexed transmission code produced by the other videoconferencing apparatus is received by the de-multiplexer 68. The de-multiplexer 68 de-multiplexes the received transmission code into the code concerning the image signal and that concerning the acoustic signal so as to provide them to the image CODEC section 65 and the audio CODEC section 66, respectively.

The image CODEC section 65 generates an image signal based on the transmission code in a conventional manner and outputs it to the display 62. In this way, an image of the participants in front of the other videoconferencing apparatus is reproduced on an screen of the display 62.

The audio CODEC section 66 generates an acoustic signal based on the obtained transmission code in the manner explained in connection with the decoding device of the first embodiment, for example, and outputs it to the loudspeaker 64. In this way, the loudspeaker 64 reproduces the voices of participants in front of the other videoconferencing apparatus.

In this embodiment, the audio CODEC section 66 of the videoconferencing apparatus is arranged to encode and transmit the acoustic signal at a bit rate of 24 kbit/s. The conventional videoconferencing apparatus encodes and transmit the acoustic signal at a bit rate of 64 kbit/s and the image signal at a bit rate of 64 kbit/s. The videoconferencing apparatus in accordance with this embodiment enables the code transmission bit rate of the acoustic signal to be decreased by 40 kbit/s relative to the above mentioned conventional videoconferencing apparatus. Accordingly, the code transmission bit rate of the image signal can be increased by 40 kbit/s. In this way, the code transmission bit rate of the image signal is increased so as to increase the number of frames of image displayed on the screen of the display from 8 frames/second to 13 frames/second, thus improving the quality of the image while maintaining the voice quality.

On the other hand, assuming that the audio CODEC section 66 is provided with the coding/decoding device in accordance with the second embodiment, the audio CODEC section 66 is arranged to encode and transmit an acoustic signal at a bit rate of 16 kbit/s. Accordingly, the videoconferencing apparatus in accordance with the second embodiment enables the code transmission bit rate of the acoustic signal to be decreased by 48 kbit/s relative to the conventional videoconferencing apparatus. Accordingly, the code transmission bit rate of the image signal can be increased by 48 kbit/s. In this way, the code transmission bit rate of the image signal is increased so as to increase the number of frames of image displayed on the screen of the display from 8 frames/second to 14 frames/second, thus further improving the quality of image while maintaining the voice quality.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, if there are coefficients having no allocated bits in a predetermined sub-band, approximate values are assigned to the coefficients having no allocated bits. This invention, however, is not limited to this arrangement, and it is possible to assign an approximate value to the coefficient if the coefficient value of the allocated bit is less than a predetermined threshold. In this connection, in the above mentioned embodiments, it may be understood that the threshold is set to 1, and if the coefficient value is less than 1, namely, equals 0 (zero), the approximate value is assigned thereto.

Further, although in the first and second embodiments, the numbers of samples M in the coding block are set to 160 and 512, respectively, it is apparent that this number M is not limited to those values.

Furthermore, although in the above mentioned embodiments, MDCT and inverse MDCT are used for the transformation and inverse-transformation of the time domain signal from/into the frequency domain signal, FFT and inverse FFT, or discrete cosine transform (DCT) and inverse DCT can be used instead.

Moreover, although in the second embodiment, the number of shifts such that the first sub-band is shifted onto other sub-band is obtained as the approximate information, this invention is not limited to this arrangement. For example, it is possible to expand or shrink one sub-band such that the correlation between the one and another sub-band becomes maximum, and to append the expansion/shrinkage rate to the number of shift so as to obtain the approximate information. Alternatively, it is possible to use the expansion/shrinkage rate solely as the approximate information. It is also of course to use other approximate information than the foregoing.

Further, although in the first embodiment, the number of shifts is predetermined, this invention is not limited this arrangement. For example, it is possible that the lower frequency sub-band be shifted such that the correlation between two sub-bands becomes maximum, and the number of shifts is multiplexed in the transmission code and transferred to the decoding device. In this case, the shift number calculation section in the coding device and the shift number decoding section and the approximate coefficient calculation section in the decoding device operates in the substantially similar manner to those in the second embodiment.

Furthermore, although in the first embodiment, the frequency band is divided into two parts, whereas in the second embodiment, it is divided into three parts, it is apparent that the frequency band can be divided into more than three parts, and the divided sub-bands be subjected to processing operations similar to those of the first or second embodiment.

Furthermore, in the present invention, the respective means need not necessarily be physical means and arrangements whereby the function of the respective means is accomplished by software fall within the scope of the present invention. In addition, the function of a single means may be accomplished by two or more physical means and the function of two or more means may be accomplished by a single physical means.

According to the present invention, it is possible to approximate coefficients having no allocated bits which may cause degradation of the quality of the reproduced signal, with or without addition of a small amount of information, and therefore it is possible to obtain a high-quality signal. In addition, since the information added to the transmission code is not large, or in certain cases, no information need be added, the invention can be suitably applied to the transmission of information at a low bit rate.

We claim:

1. A coding method for transforming a signal into coefficients in a frequency domain in blocks each consisting of a predetermined number of samples, calculating normalized coefficients which are normalizations of the coefficients of the signal in the frequency domain using a rough shape of frequency components of the signal, and encoding the signal by adaptively controlling a bit allocation and a step size of quantization of said normalized transform coefficients based on said rough shape of frequency components of the signal, comprising steps of:

dividing the frequency domain into at least two sub-bands;

approximating each of the normalized transform coefficients in a sub-band whose allocated bit value calculated based on the rough shape is less than a predetermined threshold using a quantized value of the transform coefficient in a predetermined sub-band other than said sub-band; and coding information concerning the approximation.

2. A coding method in accordance with claim 1, wherein said information concerning the approximation is obtained such that correlation between normalized transform coefficients not subjected to the quantization in said sub-band and the quantized normalized transform coefficients in said predetermined sub-band becomes maximum.

3. A coding method in accordance with claim 2, wherein said predetermined sub-band is shifted such that the correlation between normalized transform coefficients not subjected to the quantization in said sub-band and quantized normalized transform coefficients in said predetermined sub-band becomes maximum, and the number of shifts is obtained as the information concerning the approximation.

4. A coding method in accordance with claim 3, wherein said predetermined sub-band is expanded or shrunk such that the correlation between normalized transform coefficients not subjected to the quantization in said sub-band and quantized normalized transform coefficients in said predetermined sub-band becomes maximum, and an amount of expansion/shrinkage is obtained as the information concerning the approximation.

5. A coding method in accordance with claim 2, wherein said predetermined sub-band is expanded or shrunk such that the correlation between normalized transform coefficients not subjected to the quantization in said sub-band and quantized normalized transform coefficients in said predetermined sub-band becomes maximum, and an amount of expansion/shrinkage is obtained as the information concerning the approximation.

6. A coding method in accordance with claim 1, wherein said predetermined sub-band is positioned on the lowest frequency side in the divided sub-bands.

7. A coding/decoding method for transforming a signal into coefficients in a frequency domain in blocks each consisting of a predetermined number of samples, calculating normalized coefficients which are normalizations of the coefficients of the signal in the frequency domain using a rough shape of frequency components of the signal, encoding the signal by adaptively controlling a bit allocation and a step size of quantization of said normalized transform coefficients based on said rough shape of frequency components of the signal, and restoring the signal based on the transmitted code, comprising steps of:

- dividing the frequency domain into at least two sub-bands;
- approximating each of the normalized transform coefficients in a sub-band whose allocated bit value calculated based on the rough shape is less than a predetermined threshold using a quantized value of the transform coefficient in a predetermined sub-band other than said sub-band so as to obtain information concerning the approximation;
- multiplexing the information and codes obtained by adaptively controlling the bit allocation and the step size of quantization of said normalized transform coefficients so as to transmit the obtained code;
- separating the information concerning the approximation from the transmitted code to restore it; and
- based on the information concerning the approximation, assigning the transform coefficient values in the predetermined sub-band to the normalized transform coefficients whose allocated bit value obtained by the transmitted code is less than the predetermined threshold.

8. A coding/decoding method in accordance with claim 7, wherein said information concerning the approximation is obtained such that correlation between normalized transform coefficients not subjected to the quantization in said sub-band and quantized normalized transform coefficients in said predetermined sub-band becomes maximum.

9. A coding/decoding method in accordance with claim 8, wherein said predetermined sub-band is shifted such that the correlation between normalized transform coefficients not subjected to the quantization in said sub-band and quantized normalized transform coefficients in said predetermined sub-band becomes maximum, and the number of shifts is obtained as the information concerning the approximation.

10. A coding/decoding method in accordance with claim 9, wherein said predetermined sub-band is expanded or shrunk such that the correlation between normalized transform coefficients not subjected to the quantization in said sub-band and quantized normalized transform coefficients in said predetermined sub-band becomes maximum, and an amount of expansion/shrinkage is obtained as the information concerning the approximation.

11. A coding/decoding method in accordance with claim 8, wherein said predetermined sub-band is expanded or shrunk such that the correlation between normalized transform coefficients not subjected to the quantization in said sub-band and quantized normalized transform coefficients in said predetermined sub-band becomes maximum, and an amount of expansion/shrinkage is obtained as the information concerning the approximation.

12. A coding/decoding method in accordance with claim 7, wherein said predetermined sub-band is positioned on the lowest frequency side in the divided sub-bands.

13. A coding/decoding method for transforming a signal into coefficients in a frequency domain in blocks each consisting of a predetermined number of samples, calculating normalized coefficients which are normalizations of the coefficients of the signal in the frequency domain using a rough shape of frequency components of the signal, the coding signal by adaptively controlling a bit allocation and a step size of quantization of said normalized transform coefficients based on said rough shape of frequency components of the signal, and restoring the signal based on the transmitted code, comprising steps of:

- dividing the frequency domain into at least two sub-bands;
- approximating each of the normalized transform coefficients in a sub-band whose allocated bit value obtained by the transmitted code is less than a predetermined threshold, using the respective normalized transform coefficient value when a predetermined sub-band other than said sub-band is shifted by predetermined numbers.

14. A coding device arranged to transform a signal into coefficients in a frequency domain in blocks each consisting of a predetermined number of samples, calculate normalized coefficients which are normalizations of the coefficients of the signal in the frequency domain using a rough shape of frequency components of the signal, and encode the signal by adaptively controlling a bit allocation and a step size of quantization of said normalized transform coefficients based on said rough shape of frequency components of the signal, comprising:

- approximating means for dividing the frequency domain into at least two sub-bands and for approximating each of the normalized transform coefficients in said sub-band whose allocated bit value calculated based on the rough shape is less than a predetermined threshold using a quantized value of the transform coefficient in a predetermined sub-band other than said sub-band;
- approximate information coding means for encoding information concerning the approximation; and a multiplexer which multiplexes the code obtained by said approximate information coding means and transmits a multiplexed code.

15. A coding device in accordance with claim 14, wherein said approximating means is arranged such that said information concerning the approximation is obtained such that correlation between normalized transform coefficients not subjected to the quantization in said sub-band and the quantized normalized transform coefficients in said predetermined sub-band becomes maximum.

16. A coding device in accordance with claim 15, said approximating means including shift means for shifting said predetermined sub-band such that the correlation between normalized transform coefficients not subjected to the quantization in said sub-band and quantized normalized transform coefficients in said predetermined sub-band becomes maximum, and shift number calculation means for calculating a number of shifts, wherein the number of shifts is obtained as the information concerning the approximation.

17. A coding device in accordance with claim 16, said approximating means including;

expand/shrink means for expanding or shrinking said predetermined sub-band such that the correlation between normalized transform coefficients not subjected to the quantization in said sub-band and quantized normalized transform coefficients in said predetermined sub-band becomes maximum, and expansion/shrinkage amount calculation means for obtaining an amount of expansion/shrinkage, wherein the amount thereof is obtained as the information concerning the approximation.

18. A coding device in accordance with claim 15, said approximating means including;

expand/shrink means for expanding or shrinking said predetermined sub-band such that the correlation between normalized transform coefficients not subjected to the quantization in said sub-band and quantized normalized transform coefficients in said predetermined sub-band becomes maximum, and expansion/shrinkage amount calculation means for obtaining an amount of expansion/shrinkage, wherein the amount thereof is obtained as the information concerning the approximation.

19. A coding device in accordance with claim 14, wherein said predetermined sub-band is positioned on the lowest frequency side in the divided sub-bands.

20. In a system comprising a coding device and a decoding device, the coding device comprising, approximating means for dividing a frequency domain into at least two sub-bands and for approximating each of normalized transform coefficients in the sub-band whose allocated bit value calculated based on a rough shape of frequency components of a signal is less than a predetermined threshold using a quantized value of the transform coefficient in a predetermined sub-band other than said sub-band, approximate information coding means for encoding information concerning the approximation, and a multiplexer which multiplexes the code obtained by said approximate information coding means and transmits a multiplexed code, said decoding device comprising:

separate means for separating a code of the information concerning the approximation from the code transmitted from the coding device;

restore means for restoring the information concerning the approximation; and approximate coefficient calculation means, based on the information concerning the approximation, for assigning the transform coefficient value in the predetermined sub-band to each of the normalized transform coefficients whose allocated bit value obtained by the transmitted code is less than the predetermined threshold.

21. A decoding device for receiving a code and based thereon for restoring a signal, said code being obtained by transforming a signal into coefficients in a frequency domain in blocks each consisting of a predetermined number of samples, calculating normalized coefficients which are normalizations of the coefficients of the signal in the frequency domain using a rough shape of frequency components of the signal, and encoding the signal by adaptively controlling a bit allocation and a step size of quantization of said normalized transform coefficients based on said rough shape of frequency components of the signal, said decoding device comprising:

shift means for dividing the frequency domain into at least two sub-bands and for shifting a predetermined sub-band by a predetermined number of shifts when a allocated bit value relative to the normalized transform coefficient in a sub-band other than said predetermined sub-band is less than a predetermined threshold; and approximating means for approximating each of the normalized transform coefficients whose allocated bit value is less than the predetermined threshold using the respective normalized transform coefficient value in the predetermined sub-band shifted by said shift means.

22. A decoding device in accordance with claim 21, wherein said predetermined sub-band is positioned on the lowest frequency side in the divided sub-bands.

23. A coding method for frequency-transforming an input digital signal in blocks each consisting of a predetermined number of samples to obtain transform coefficients, calculating normalized transform coefficients by normalizing transform coefficients based on an allocation thereof, and encoding the signal by adaptively controlling a bit allocation and a step size of quantization of said normalized transform coefficients based on said allocation of transform coefficients so as to obtain a code, comprising steps of:

dividing the frequency domain where the normalized transform coefficients are distributed into at least two sub-bands; and approximating each of the normalized transform coefficients in said sub-band whose allocated bit value thereof is less than a predetermined threshold using a quantized value of the transform coefficient in a predetermined sub-band other than said sub-band so as to obtain the code including information concerning the approximation.

24. A decoding method for decoding a code, said code is obtained by a coding method for frequency-transforming an input digital signal in blocks each consisting of a predetermined number of samples to obtain transform coefficients, calculating normalized transform coefficients by normalizing the transform coefficients based on an allocation thereof, and encoding the signal by adaptively controlling a bit allocation and a step size of quantization of said normalized transform coefficients based on said allocation of transform coefficients so as to obtain a code, said coding method comprising steps of dividing a frequency domain where the normalized transform coefficients are distributed into at least two sub-bands, and approximating each of the normalized transform coefficients in said sub-band whose allocated bit value is less than a predetermined threshold using a quantized value of the transform coefficient in a predetermined sub-band other than said sub-band so as to obtain the code including information concerning the approximation, said decoding method comprising a step of:

approximating each of the normalized transform coefficients in said sub-band whose allocated bit value is less than the predetermined threshold using a quantized value of the transform coefficient in the predetermined sub-band so as to restore the signal.

25. A decoding method for decoding a code, said code is obtained by frequency-transforming an input digital signal in blocks each consisting of a predetermined number of samples to obtain transform coefficients, calculating normalized transform coefficients by normalizing the transform coefficients based on allocation thereof, and encoding the signal by adaptively controlling a bit allocation and a step size of quantization of said normalized transform coefficients based on said allocation of transform coefficients, said decoding method comprising steps of:

dividing a frequency domain where the normalized transform coefficients are distributed into at least two sub-bands; and approximating each of the normalized transform coefficients in said sub-band whose allocated bit value is less than a predetermined threshold using a quantized value of the transform coefficient in a predetermined sub-band so as to restore the signal.

* * * * *